United States Patent
Haffner

[11] 3,875,819
[45] Apr. 8, 1975

[54] SAFETY GRIP FOR POWERED IMPLEMENT
[75] Inventor: Donald G. Haffner, Greendale, Wis.
[73] Assignee: Jacobsen Manufacturing Company, Racine, Wis.
[22] Filed: Apr. 27, 1973
[21] Appl. No.: 355,067

[52] U.S. Cl................................ 74/489; 74/551.8
[51] Int. Cl............................................ G05g 11/00
[58] Field of Search ............ 74/523, 488, 489, 543, 74/551.7, 551.8; 192/1, 3 S; 180/77 R, 19 R

[56] References Cited
FOREIGN PATENTS OR APPLICATIONS
| 1,092,332 | 11/1960 | Germany | 74/551.8 |
| 792,769 | 4/1958 | United Kingdom | 74/489 |
| 1,124,891 | 10/1956 | France | 74/489 |

*Primary Examiner*—Benjamin W. Wyche
*Assistant Examiner*—Frank H. McKenzie, Jr.
*Attorney, Agent, or Firm*—Arthur J. Hansmann

[57] ABSTRACT

A safety grip for powered implements of the hand-controlled type and including a horizontally disposed hand grip and two levers connected therewith and pivoted on a horizontal axis and extending above the hand grip. The weight of the operator's hand and arm are then placed downwardly onto either or both of the levers to pivot the levers into closed position relative to the hand grip, and the operator need not squeeze the levers and hand grip together to achieve the closed position. One of the levers can control the engagement of the traction for the implement and the other lever may control the working portion of the implement, and the two levers are pivotally attached to the implement's handle and are movable both separately and also together.

3 Claims, 6 Drawing Figures

SAFETY GRIP FOR POWERED IMPLEMENT

This invention relates to a safety grip for powered implements of the hand-controlled type. More particularly, it relates to multiple lever controls of the dead man's type which requires that the operator be gripping or squeezing the control in order to have the control in the operative position.

BACKGROUND OF THE INVENTION

The prior art is already aware of lever type of controls for powered implements, and examples of such are seen in U.S. Pat. No. 2,696,705 where the implement is a lawn mower and the operating controls include a pivoted lever adjacent the hand grip. However, this type of control lever requires that the operator exert a squeezing force through his hand in order to pivot the lever into closed position with the hand grip, and he must maintain that squeezing tension in his hand and arm in order to have the control in operation. Other examples of this type of lever control which require squeezing are shown in U.S. Pat. Nos. 2,768,821 and 2,903,077 where the levers are on horizontal pivots but are disposed below the implement hand grips, and again the operator must maintain a hand squeeze in order to have the levers in the closed or operative position.

Also, U.S. Pat. Nos. 1,153,800 and 2,477,945 and 3,312,300 show controls adjacent the hand grip, but they are actuated by squeezing.

Still other examples of a lever type control are shown in U.S. Pat. Nos. 2,773,481 and 3,190,386 where the latter shows a lever is pivoted above a hand grip which is enclosed in a tubular housing, and thus the operator must reach into the housing and again squeeze the lever into closed position with the hand grip in order to place the control in operating position. Also, U.S. Pat. No. 1,955,967 shows a pivoted cover which pivots at the handle rear end. U.S. patent application Ser. No. 247,181, now abandoned, filed Apr. 24, 1972, and now U.S. Pat. No. 3,800,616, issued Apr. 2, 1974, discloses a safety grip with one pivoted lever. The present invention utilizes and adapts two levers in a pivoted position above the hand grip.

With regard to any double levers of the prior art, there is no arrangement which fully avoids the squeezing action, and thus the operator must continually exert a hand force in order to have the pivoted control lever in the operative position. Of course such exertion requires effort and is tiring, and it is a distraction from the major concern of steering and otherwise controlling the implement itself. Still further, with some of the prior art pivoted levers, the operator cannot hold only the hand grip, that is not without also holding the pivoted levers, since there simply is not sufficient provision or room for him to grip the hand grip without also encountering the levers. This shortcoming in prior art devices means that the operator does not have the option of gripping and controlling the implement without also encountering or gripping the pivoted levers, and thus his choice and freedom for maneuvering the implement is restricted in the prior art arrangements.

Accordingly, it is a general object of this invention to provide a safety grip for powered implements of the hand controlled type and wherein the grip is in the nature of a dead man's grip and presents two pivoted levers and is a general improvement upon the prior art grips, according to the aforementioned problems and concerns.

More specifically, it is an object of this invention to provide safety grip for powered implements wherein the weight of the operator's hand and arm alone are sufficient to pivot the control levers of the grip into the closed or operating position, and therefore the operator is not required to squeeze the levers through a continuous forcing by his hand.

Still another specific object of this invention is to provide a safety grip for powered implements and having the aforementioned advantages and wherein the operator can grasp either the hand grip or the safety levers along with the hand grip, but he need not always grasp the safety levers and may grasp only the hand grip and thereby guide the implement through grasping the hand grip only.

Additionally, in this dual lever control one of the two levers controls the traction of the implement and the other of the two levers controls the working implement itself. In accomplishing this object, the levers are movable both separately and together, and either one may be manipulated for its respective function independent of the other lever manipulation. Still further, the two levers have the advantage of being safety levers and only the weight of the operator's arm is required for pivoting the levers to an engaged or actuating position. Still further, both levers are located on one handle or hand grip of the implement, and thus the operator's other hand is free and available for manipulating other controls of the implement, such as the forward and reverse control and also the speed control of the machine.

Other objects and advantages will become apparent upon reading the following disclosure, and these include the simplicity of structure and the inexpensive manufacture and the ease of operating and the automatic nature of operating the safety grip of this invention.

DETAILED DESCRIPTION OF THE PREFERRED EMBODIMENT

An implement handle 10 is shown extending in a rearward and upward direction from an implement which may be resting on the ground and which may be a snow blower or the like. The handle 10 terminates in a horizontally extending portion 11 which carries a hand grip 12. The handle 10 and the implement itself is of a conventional nature which terminates in the horizontally extending portion 11 which is disposed in the fore-and-aft direction of the implement.

Figure 1:
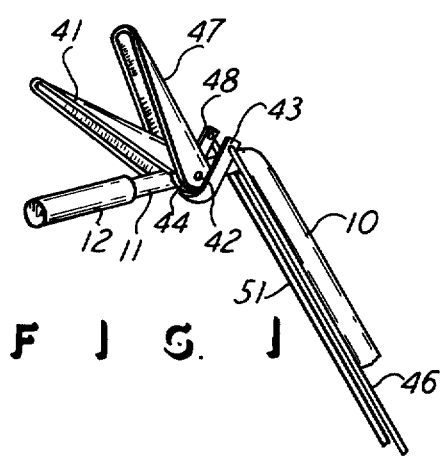
FIG. 1 is a rear perspective view of a preferred embodiment of this invention and showing the two levers.

FIG. 1 shows a lever 41 in its limited upward pivoted position, and, in this position, the lever 41 is 45 degrees or so angulated upwardly relative to the horizontal plane of the handle portion 11 and the hand grip 12. Thus, in the FIG. 1 position, the operator has the choice of placing his hand on top of the hand grip 12, without touching the lever 41, or he can place his hand on the lever 41 and move it to the position shown in FIG. 5. Of course if he does not place his hand on top of the lever 41 to move it to the FIG. 5 position, then he is not utilizing the lever 41 and operating a control rod 51, but, instead, he is simply guiding the implement without the need for negotiating the lever 41. It will be further noted that the lever 41 is arcuately shaped along its length, and the hand grip 12 is cylindrically shaped along its length, and the lever 41 forms substantially a semi-circular cross-section so the lever 41 nests with the grip 12, due to the arcuate or curved shape of the lever 41 and thus one substantially continuous grip is available to the operator in the operating or FIG. 5 position of the lever 41 and he can therefore obtain efficient and full control of the implement. Of significant importance is the fact that the lever 41 is pivoted about a horizontal pivot pin 42 and is therefore pivotal in a vertical plane so that with the lever pivotal above the hand grip 12 only the weight of the operator's hand and arm is necessary and required for pivoting the lever to the operating or closed position of FIG. 5. That is, the operator does not have to continuously exert hand force and squeeze the lever 41 against the hand grip 12. Further, by means hereinafter described, as soon as the operator removes the weight of his hand and arm from the lever 41, then the lever 41 returns to the FIG. 1 position and the control is then shut off.

Figure 5:
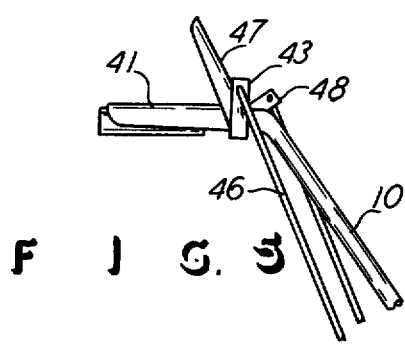
FIG. 5 is a side view of the embodiment of the two levers and showing another one of the levers in the engaged position.
Figure 6:
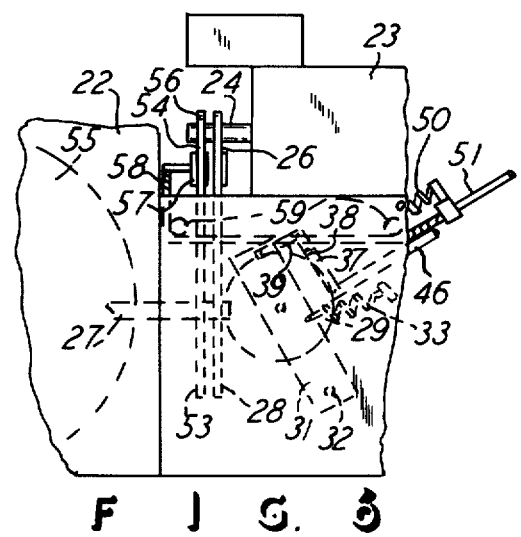
FIG. 6 is a side view of a fragment of the implement and showing the attachment of the levers to the power-take-off parts of the implement.

FIG. 6 shows one use of the safety grip shown and described in connection with FIGS. 1 thru 5, and this use is that for a powered implement of a snow blower type and is as shown and described in U.S. Pat. No. 3,334,429. Here a snow blower housing 22 supports a gasoline engine 23 whose crank shaft 24 drives a belt 26 which will cause rotation of a disc 28 which is freely rotatable on the blower driven shaft 27. A driven disc 29 can be placed into rolling contact with the disc 28, and is rotatably supported on a pivoted bracket 31 which pivots about the pivot support 32 suitably mounted on the implement housing 22. Thus the driven disc 29 can move toward and away from the disc 28 and thereby be placed into driving or free position relative to the disc 28. A tension spring 33, connected between the bracket 31 and the implement housing 22, normally urges the bracket 31 into a clockwise pivoted position as seen in FIG. 6, and this normally moves the disc 29 away from the disc 28.

The lever 41 is pivotally mounted to the handle portion 11 by means of a pivot pin 42 extending therethrough. An upstanding arm 43 is suitably secured to a lower projecting portion 44 of the lever 41, and the connection between the lever 41 and the arm 43 may be a welded connection so that the two are affixed together to move as a unit. That is, when the lever 41 is pivoted about its pivot pin 42, the arm 43 will likewise pivot, and the rod 46 which is attached to the upper end of the arm 43 will then be axially displaced to control the power take-off parts connected to the lower end of the rod 46.

To engage the implement drive by moving the disc 29 into rolling contact with the disc 28, the lever or safety grip 41 is operated and the attached control rod 46 is axially displaced to effect the driving engagement mentioned. Thus the control rod 46 is suitably connected to the bracket 31 to move the disc 29 into driving engagement with the disc 28 when the lever 16 is placed into the FIG. 5 position. The connection between the rod 46 and the bracket 31 is shown to be a pivoted lever 37 which is pivoted on the implement housing 22 at the pivot connection 38. A link 39 has one end pivotally connected to the end of the lever 37 and the other end of the link 39 is pivotally connected to the bracket 31. Through this type of linkage connection, retraction of the rod 46 toward the hand grip 12 will pivot the bracket 31 into a position to cause the rotatable disc 29 to move into rolling contact with the disc 28, as mentioned. The tension spring 33 withdraws the disc 29 and retracts the rod 46 and urges lever 41 to its raised position. Further, it will be seen and understood by one skilled in the art that the connection described is substantially a conventional type, and, it includes drive means to the ground engaging wheels of the implement fragmentarily shown so that the disc 29 can be utilized to transmit the traction power to the implement, and as in U.S. Pat. No. 3,334,429.

FIGS. 1 thru 5 also show that there is another lever, designated 47, and this lever is also pivotally mounted on the handle portion 11 by means of the pivot pin 42, and an arm 48 is affixed to the lever 47, such as by welding. Thus the arm 48 pivots in accordance with the pivoting of the lever 47, and a rod 51 is pinned to the upper end of the arm 48 to be axially displaced when the arm 48 is pivoted. The rod 51, like the rod 46, extends down to the power-take-off mechanism of the machine, as will be described later, and for now it will be understood that the lever 47 and its rod 51 control the machine's implement or working element itself, such as a snow thrower auger mentioned later.

Figure 2:
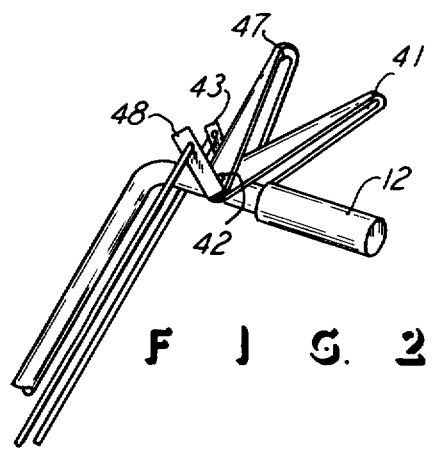
FIG. 2 is a rear perspective view of the embodiment shown in FIG. 1 and taken from the other side thereof.

FIGS. 1 and 2 show the levers 41 and 47 in the disengaged position, and these levers are then in their upper limit of pivot, and suitable stops are employed for establishing the upper limit of pivot shown in FIGS. 1 and 2, such as by having the levers 41 and 47 abut the top end of the handle portion 11 in the extent of the levers 41 and 47 across the top of the handle portion 11 and at the lower ends of the levers 41 and 47.

Figure 3:
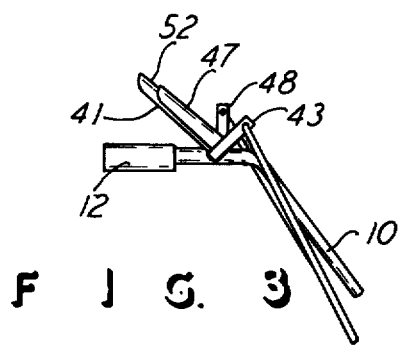
FIG. 3 is a side view of the embodiment of the two levers and showing one of the levers in its engaged position.
Figure 4:
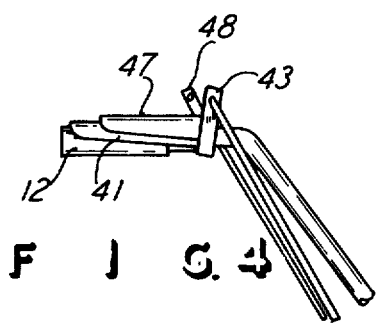
FIG. 4 is a side view of the embodiment of the two levers and showing both levers in the engaged position.

Further, the levers 41 and 47 are arcuately shaped in cross section to nest with each other and to also nest with the cylindrical hand grip 12, as seen in FIGS. 3, 4 and 5. Thus, the position in FIG. 3 is achieved by the operator resting his arm on the upper lever 47 to thereby have the operator's weight of his arm depress the lever 47 and bring it into nested position with the lower lever 41. In the position of FIG. 3, the implement working tool, such as the snow thrower auger, would be in the clutch-engaged position, as further described later. The operator would simply retain the lever 47 in the position shown in FIG. 3 to have the working implement operating while the entire machine is not being propelled in any direction.

FIG. 4 shows the levers 41 and 47 in the actuated positions, and they are nested with each other and also with the hand grip 12 and here the machine's traction parts are in the clutch-engaged position and also the machine's working implement is in the clutch-engaged position, since both levers are being depressed by the weight of the operator's arm bearing down on the levers and onto the hand grip 12.

Finally, the FIG. 5 position shows that only the lever 41 is in the downward or engaged position, and it will again be understood that the operator's arm is resting downward on the lever 41 to hold the lever down and against the hand grip 12 for engaging the clutch for propelling the machine while the clutch for the machine's working implement, as controlled by the lever 47, is not in the engaged position.

In all instances, it will be understood that as soon as the operator removes the weight of his hand and arm from either or both of the levers 41 and 47, the levers return to the upward or disengaged position, and thus there is this safety feature, as previously described. A tension spring 50 connects between the rod 51 and the housing 22 to urge the rod downwardly, and thus the lever 47 upwardly. Further, it will be seen that the lever 47 is slightly shorter than the lever 41, and thus the lever 41 has an extended end 52 which is available to the operator for immediate and convenient depressing of the lever 41 when it is desired to not depress or release the shorter lever 47. That is, the operator can move the levers from the FIG. 4 position to the FIG. 5 position simply by sliding his hand rearwardly and clear of the shorter lever 47, for example.

FIG. 6 further shows there is a pulley 53 which is fixed to the shaft 27 to rotate therewith, and it will also be understood that the shaft 27 is the working tool or implement shaft which may be in suitable driving engagement with an auger designated 55, in the instance of a snow thrower machine. The pulley 53 is driven through a belt 54 and off a pulley 56 on the engine shaft 24. Also, an idler pulley 57 is engageable with the belt 54 and is under the control of a cable 58 extending around guide points 59 and connected to the control rod 51. Thus, axial displacement of the rod 51 will displace the cable 58 and in turn displace the idler pulley 57 to release or press relative to the belt 54 and thereby rotate the pulley 53 and the auger shaft 27. Thus the working implement or auger 55 is under control of the lever 47.

Of course other arrangements could be made for connecting the levers 41 and 47 to the clutch arrangements described and shown in FIG. 6, but the showings indicate one suitable way of utilizing the pivotal action of the respective arms 43 and 48 for controlling the traction and working tool clutches described herein. Further, with the arrangement of the two levers on one side, or subject to only one hand of the operator for controlling both levers 41 and 47, the operator's other hand is free for controlling the machine's other controls such as the forward and rear control and the speed control and the like. Still further, the operator can either grip the hand grip 12, by inserting his hand between the grip 12 and the lever 41, without engaging either lever 41 and 47, for steering the machine, and only the weight of the operator's hand and arm are necessary for engaging the levers so that a true dead man's control is provided and the levers require only a minimum of effort to retain them in the engaged position and the operator need not exhaust himself by continuous gripping of the levers to keep them in the engaged position. Still further, in the engaged position of the lever 41, in FIG. 5, and of both levers, in FIG. 4, the operator has complete steering control of the implement through the hand grip 12, since the levers 41 and 47 nest with each other and with the hand grip, as described. Thus the lever 41 is slightly smaller in width than the lever 47, for the nesting shown, and the lever 41 is substantially the length of the grip 12 to extend to the end thereof. Also, the engaged position for the lever 47 is when it is down to the upper limit stop of the lever 41, so the operator then knows the engaged position for lever 47, and the engaged position for the lever 41 and also for the two levers 41 and 47 is at the limit of pivot downwardly to the grip 12.

What is claimed is:

1. A safety grip for powered implements of the hand-controlled type, comprising a handle, a hand grip on the end of said handle, a pivot pin horizontally disposed on said handle, two levers with each pivotally mounted directly on said pivot pin and independent of each other's pivot motion and with both said levers being disposed directly above said handle and in an inoperative position clear of said hand grip which extends at least generally in a horizontal direction of orientation for being grasped by the operator's hand without touching said levers, a respective control member attached directly to each of said levers and extending therefrom for controlling the operation of the powered implement according to the respective pivoted position of each of said levers, biasing means operative on said control members for yielding urging said levers to the inoperative pivoted position clear of said hand grip, said levers being pivotally mounted to extend in overlapping relation and being arcuately shaped to nest with each other and with said grip in the operative downwardly pivoted position of said levers, said levers being vertically spaced apart in their respective upward positions and presenting a space between said lever sufficient to receive the operator's hand for selective depressing of either of said levers, the upper one of said levers being only slightly shorter than the lower one thereof with said levers being arranged to overlie each other and said grip in the downwardly pivoted position.

2. A safety grip as claimed in claim 1, wherein said levers are disposed vertically above said grip and clear of any obstruction in the vertical plane thereabove so that the operator's arm can be disposed directly above said levers when his hand is on said levers, whereby the downward force of the weight of the hand and arm of the operator holds said levers downward without the need for hand-squeezing said levers to said grip.

3. The safety grip as claimed in claim 1, wherein the lower one of said levers is slightly smaller in width compared to the width of the upper one thereof, for nesting of said levers, and the lower one of said levers extends beyond the upper one of said levers, for effecting release of said upper lever by the operator's hand while retaining the hand on said lower lever.

* * * * *